United States Patent
Lee et al.

(10) Patent No.: US 8,139,524 B2
(45) Date of Patent: Mar. 20, 2012

(54) CONTROL CHANNEL RECEPTION METHOD FOR RECEIVING BROADCAST OR MULTICAST SERVICE

(75) Inventors: Young-Dae Lee, Gyeonggi-Do (KR); Sung-Duck Chun, Gyeonggi-Do (KR); Sung-Jun Park, Gyoenggi-Do (KR); Seung-June Yi, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 316 days.

(21) Appl. No.: 12/451,784

(22) PCT Filed: Jun. 18, 2008

(86) PCT No.: PCT/KR2008/003467
§ 371 (c)(1),
(2), (4) Date: Dec. 1, 2009

(87) PCT Pub. No.: WO2008/156309
PCT Pub. Date: Dec. 24, 2008

(65) Prior Publication Data
US 2010/0189026 A1    Jul. 29, 2010

Related U.S. Application Data

(60) Provisional application No. 60/944,785, filed on Jun. 18, 2007, provisional application No. 60/945,090, filed on Jun. 19, 2007.

(51) Int. Cl.
*H04W 4/00* (2009.01)
*H04J 3/24* (2006.01)

(52) U.S. Cl. ................... 370/328; 370/474; 714/748

(58) Field of Classification Search ........... 370/252, 370/328, 338, 474; 714/746–750
See application file for complete search history.

(56) References Cited

U.S. PATENT DOCUMENTS
6,725,267 B1    4/2004    Hoang
(Continued)

FOREIGN PATENT DOCUMENTS
EP        1 168 877        1/2002
(Continued)

OTHER PUBLICATIONS

NTT Docomo et al.: "Mac PDU Structure for LTE" 3GPP Draft; R2-070280, $3^{rd}$ Generation Partnership Project (3GPP), Mobile Competence Centre; 650, Route Des Lucioles; F-06921 Sophia-Antipolis Cedex ; France, vol. Ran WG2, No. Sorrento, Italy; 20070112, Jan. 12, 2007, XP050133369; [retrieved on Jan. 12, 2007].

(Continued)

*Primary Examiner* — Steven H Nguyen
(74) *Attorney, Agent, or Firm* — McKenna Long & Aldridge LLP

(57) ABSTRACT

Disclosed is the radio (wireless) terminal which receives a broadcast or multicast service, and more particularly, to a control information reception method for a terminal, which, if control information received through a certain control channel is segmented with the one or more data units for transmission, receives the one or more data units from a network, and stores the one or more data units in every modification period if the control information cannot be completely decoded by the received one or more data units, wherein if the control information is determined to be modified in a current modification period, the terminal discards the stored one or more data units, and if the control information is determined not to be modified in the current modification period, the terminal does not discard the stored one or more data units.

14 Claims, 3 Drawing Sheets

U.S. PATENT DOCUMENTS

| | | | |
|---|---|---|---|
| 6,795,419 | B2 | 9/2004 | Parantainen et al. |
| 7,551,643 | B2 | 6/2009 | Yeo et al. |
| 8,064,676 | B2 * | 11/2011 | Li et al. ............ 382/132 |
| 2001/0017850 | A1 | 8/2001 | Kalliokulju et al. |
| 2002/0028690 | A1 | 3/2002 | McKenna et al. |
| 2002/0057663 | A1 | 5/2002 | Lim |
| 2003/0123485 | A1 | 7/2003 | Yi et al. |
| 2003/0147371 | A1 * | 8/2003 | Choi et al. ............ 370/341 |
| 2003/0165133 | A1 | 9/2003 | Garani |
| 2003/0189922 | A1 | 10/2003 | Howe |
| 2003/0207696 | A1 | 11/2003 | Willenegger et al. |
| 2004/0014452 | A1 | 1/2004 | Lim et al. |
| 2004/0117860 | A1 | 6/2004 | Yi et al. |
| 2004/0253959 | A1 | 12/2004 | Hwang et al. |
| 2005/0020260 | A1 | 1/2005 | Jeong et al. |
| 2005/0041610 | A1 | 2/2005 | Lee et al. |
| 2005/0041681 | A1 | 2/2005 | Lee et al. |
| 2005/0085254 | A1 | 4/2005 | Chuah et al. |
| 2005/0094670 | A1 | 5/2005 | Kim |
| 2005/0141462 | A1 | 6/2005 | Aerrabotu et al. |
| 2005/0176430 | A1 * | 8/2005 | Lee et al. ............ 455/436 |
| 2005/0176474 | A1 | 8/2005 | Lee et al. |
| 2005/0185620 | A1 | 8/2005 | Lee et al. |
| 2005/0238051 | A1 | 10/2005 | Yi et al. |
| 2006/0067364 | A1 | 3/2006 | Jung et al. |
| 2006/0087994 | A1 | 4/2006 | Barth et al. |
| 2006/0126554 | A1 | 6/2006 | Motegi et al. |
| 2006/0165045 | A1 | 7/2006 | Kim et al. |
| 2006/0209870 | A1 | 9/2006 | Lee et al. |
| 2006/0245417 | A1 | 11/2006 | Conner et al. |
| 2006/0251105 | A1 * | 11/2006 | Kim et al. ............ 370/449 |
| 2007/0024972 | A1 | 2/2007 | Kuerz et al. |
| 2007/0060139 | A1 | 3/2007 | Kim et al. |
| 2007/0165567 | A1 | 7/2007 | Tan et al. |
| 2007/0177569 | A1 | 8/2007 | Lundby |
| 2007/0206531 | A1 | 9/2007 | Pajukoski et al. |
| 2007/0248075 | A1 | 10/2007 | Liu et al. |
| 2007/0291646 | A1 * | 12/2007 | Ohishi et al. ............ 370/236 |
| 2007/0291673 | A1 | 12/2007 | Demirhan et al. |
| 2007/0291728 | A1 | 12/2007 | Dalsgaard et al. |
| 2007/0291729 | A1 | 12/2007 | Dalsgaard et al. |
| 2007/0291788 | A1 | 12/2007 | Sammour et al. |
| 2008/0056198 | A1 | 3/2008 | Charpentier et al. |
| 2008/0056273 | A1 | 3/2008 | Pelletier et al. |
| 2008/0089285 | A1 * | 4/2008 | Pirskanen et al. ............ 370/329 |
| 2008/0101268 | A1 | 5/2008 | Sammour et al. |
| 2008/0167089 | A1 | 7/2008 | Suzuki et al. |
| 2008/0181127 | A1 | 7/2008 | Terry et al. |
| 2008/0310452 | A1 | 12/2008 | Vedantham et al. |
| 2009/0086659 | A1 | 4/2009 | Pani et al. |
| 2009/0086710 | A1 | 4/2009 | Ho |
| 2009/0092076 | A1 | 4/2009 | Zheng et al. |
| 2010/0061330 | A1 | 3/2010 | Hanov |
| 2010/0128669 | A1 | 5/2010 | Chun et al. |
| 2010/0165901 | A1 * | 7/2010 | Kim ............ 370/312 |

FOREIGN PATENT DOCUMENTS

| | | |
|---|---|---|
| EP | 1 209 938 | 5/2002 |
| EP | 1 315 356 | 5/2003 |
| EP | 1315356 A2 | 5/2003 |
| EP | 1 318 632 | 6/2003 |
| EP | 1337124 A2 | 8/2003 |
| EP | 1 372 310 A1 | 12/2003 |
| EP | 1511245 A2 | 3/2005 |
| EP | 1 720 322 A1 | 11/2006 |
| EP | 1 720 373 | 11/2006 |
| JP | 6-006294 | 1/1994 |
| JP | 2003-235064 | 8/2003 |
| JP | 2005-354488 | 12/2005 |
| JP | 2006-067115 | 3/2006 |
| JP | 2009-540721 | 11/2009 |
| JP | 2009-542100 | 11/2009 |
| KR | 10-2001-0105240 | 11/2001 |
| KR | 10-2004-0039944 | 5/2004 |
| KR | 2004-0048675 | 6/2004 |
| KR | 10-2005-0008440 | 1/2005 |
| KR | 10-2005-0027972 | 3/2005 |
| KR | 10-2005-0096763 | 10/2005 |
| RU | 2 249 917 | 4/2005 |
| WO | WO 00/54521 | 9/2000 |
| WO | WO 00/74416 | 12/2000 |
| WO | WO 01/05050 | 1/2001 |
| WO | WO 2004/043099 | 5/2004 |
| WO | WO 2004/064272 | 7/2004 |
| WO | WO 2004-100400 A1 | 11/2004 |
| WO | WO 2004-102836 A1 | 11/2004 |
| WO | WO 2006/075820 A1 | 7/2006 |
| WO | WO 2006-104343 A2 | 10/2006 |
| WO | WO 2006/104344 | 10/2006 |
| WO | WO2006/109851 | 10/2006 |
| WO | WO 2007/052888 | 5/2007 |
| WO | WO 2007/078155 | 7/2007 |
| WO | WO 2007/078172 | 7/2007 |
| WO | WO 2007-078929 A2 | 7/2007 |
| WO | WO 2009/084998 A1 | 7/2009 |

OTHER PUBLICATIONS

Catt et al.: "Enhancement to Buffer Status 1-7 Reporting" 3GPP Draft; R2-071345, $3^{rd}$ Generation Partnership Project (3GPP), Mobile Competence Centre; 650, Route Des Lucioles; F-06921 Sophia-Antipolis Cedex; France, vol. Ran Wg2, No. St. Julian; 20070322, Mar. 22, 2007, XP050134291 [retrieved on Mar. 22, 2007].

LG Electronics, "PDCP Retransmissions" R2-073041, XP050135778, 3GPP TSG-RAN WG2 #59. Aug. 19-24, 2007, Athens, Greece.

LG Electronics, "PDCP Structure and Traffic Path" R2-073259, XP050135985, 3GPP TSG-RAN WG2 #59. Aug. 20-24, 2007, Athens, Greece.

LG Electronics, "Contents of PDCP Status Report" R2-07xxxx, XP002580785, 3GPP TSG-RAN WG2 #59. Oct. 8-12, 2007, Shanghai, China.

Bosch: "header compression signalling" 3GPP Draft; Header Compression Signalling, $3^{RD}$ Generation Partnership Project (3GPP), Mobile Competence Centre; vol. RAN WG2, No. Sophia Antipolis, France; 19991129, Nov. 29, 1999, XP050114120.

"$3^{RD}$ Generation Partnership Project; Technical Specification Group radio Access Network; Packet Data Convergence Protocol (PDCP) specification (Release 7)" 3GPP Standard; 3GPP TS 25.323, $3^{RD}$ Generation Partnership Project (3GPP), Mobile Competence Centre; 650, Route Des Lucioles; F-06921 Sophia-Antipolis Cedex; France, No. V7.4.0, Mar. 1, 2007, pp. 1-44, XP050367856.

"$3^{rd}$ Generation Partnership Project; Technical Specification Group Radio Access Network; Evolved Universal terrestrial radio Access (E-UTRA) Medium Access Control (MAC) protocol specification (Release 8)", 3GPP Standard; 3GPP TS 36.321, Sophia-Antipolis, France, No. V8.1.0, Mar. 1, 2008, XP050377617.

LG Electronics: "3GPP Draft; UL Timing Control Related to Contention Resolution_R4", $3^{rd}$ Generation Partnership Project (3GPP), Shenzhen, China, Mar. 31-Apr. 4, 2008, R2-081607, XP50139334.

Nokia; "Requirements for redirection in E-UTRAN", 3GPP TSG-RAN WG2 Meeting #56-bis, R2-070107, Jan. 2007.

IPWireless; "Layer 2 functions for LTE", 3GPP TSG RAN WG2 #48bis, R2-052377, Oct. 2005.

Samsung; "Selective forwarding/retransmission during HO", 3GPP TSG-RAN2 Meeting #56bis, R2-070130, Jan. 2007.

Samsung; "Re-use of PDCP SN at ARQ level ?", 3GPP TSG-RAN2 Meeting #53bis, R2-061829, Jun. 2006.

Panasonic; "MAC PDU format for LTE", 3GPP TSG RAN WG2#56bis, R2-070096, Jan. 2007.

LG Electronics Inc.; "Relative Buffer Status Reporting", 3GPP TSG-RAN WG2 meeting #46bis, R2-050852, Apr. 2005.

IP Wireless: "Contention Resolution in Non-synchronous RACH Access", RAN2 #54, Tallinn, Estonia, Aug. 28-Sep. 1, 2006, R2-062269.

ASUSTEK: "Granularity consideration for variable RLC PDU sizes" 3GPP Draft; R2-070336 Granularity Consideration for Variable RLC PDU Sizes, $3^{rd}$ Generation Partnership Project (3GPP), vol. RAN WG2, No. Sorrento, Italy; 20070112, Jan. 12, 2007, XP050133423.

"3rd Generation Partnership Project; Technical Specification Group Radio Access Network; Medium Access Control (MAC) protocol specification (Release 7)"3GPP Standard; 3GPP TS 25.321, 3rd Generation Partnership Project (3GPP), No. V7.4.0, Mar. 1, 2007, pp. 1-126, XP050367709.

Youjun Gao et al.: "Research on the access network and MAC technique for beyond 3G systems" IEEE Wireless Communications, IEEE Service Center, Piscataway, NJ, US, vol. 14, No. 2, Apr. 1, 2007, pp. 57-61, XP011184637.

Nokia Corporation, Nokia Siemens Networks: "Mac Header Format" 3GPP TSG-RAN WG2 Meeting #59bis: R2-073891; Shanghai, China, Oct. 8-12, 2007, XP-002602993.

LG Electronics Inc: "Support or VoIP over MAC-hs/ehs"; 3GPP TSG-RAN WG2#57bis; R2-071542; St. Julian's, Malta; Mar. 26-30, 2007, XP-50134474A.

Youjun Gao et al.: "Research on the access network and MAC technique for beyond 3G systems" IEEE Wireless Communications, IEEE Service Center, Piscatavvay, NJ, US, vol. 14; No. 2, Apr. 1, 2007, pp. 57-61, XP-011184637.

Alcatel-Lucent: "DL Control Signaling and Multiplexing for VoIP" 3GPP TSG RAN WG1 Meeting #48bis; R1-071721; St. Julians, Malta Mar. 26-30, 2007; XP-002460800.

* cited by examiner

[Fig. 1]
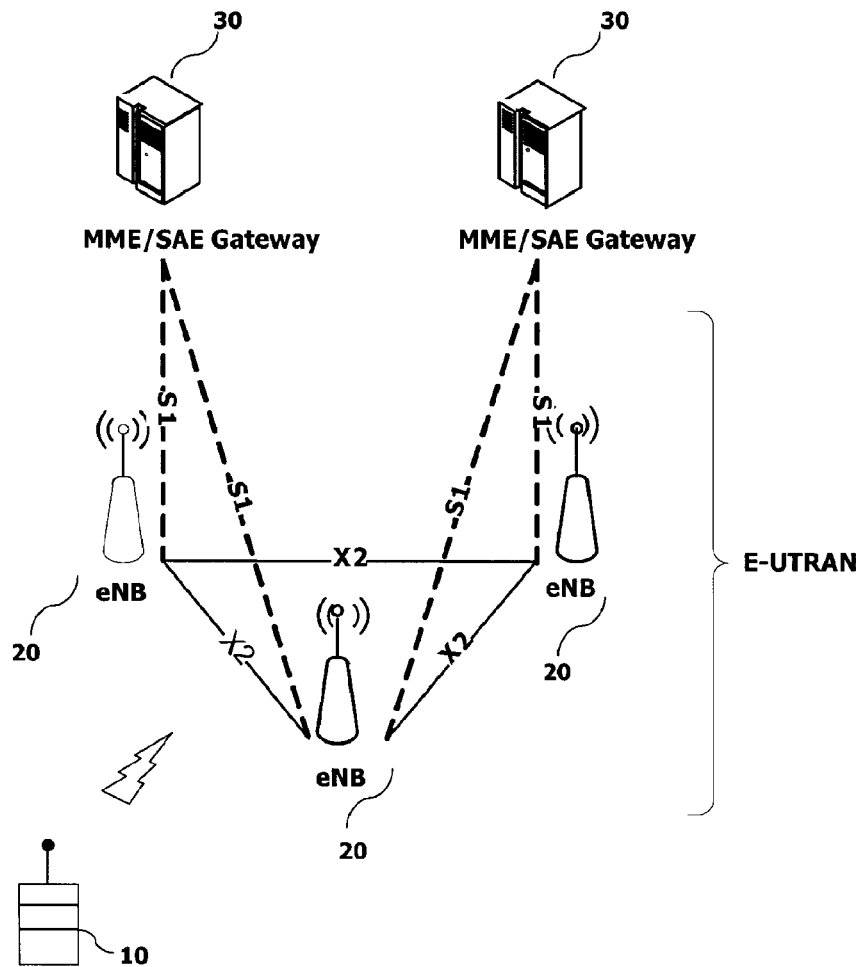
[Fig. 2]
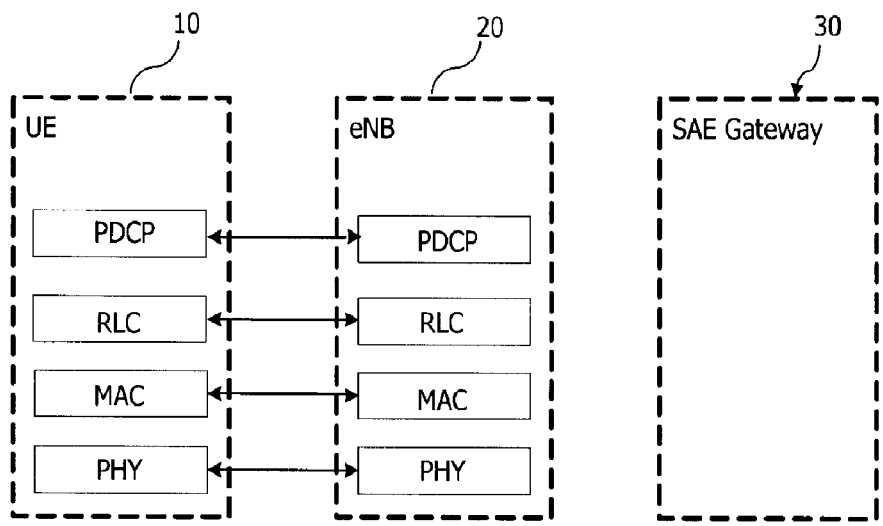

[Fig. 3]
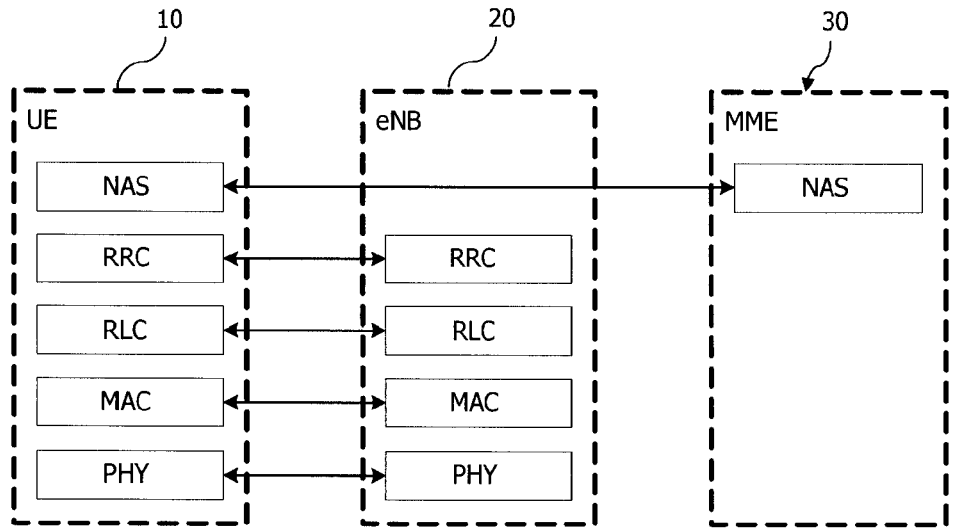
[Fig. 4]
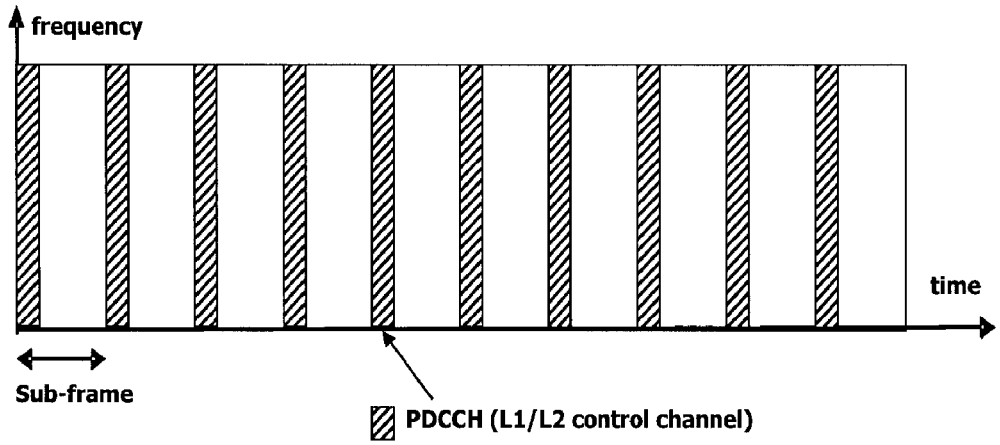
[Fig. 5]
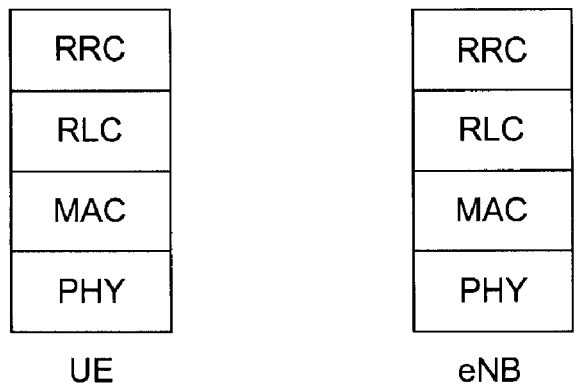

[Fig. 6]
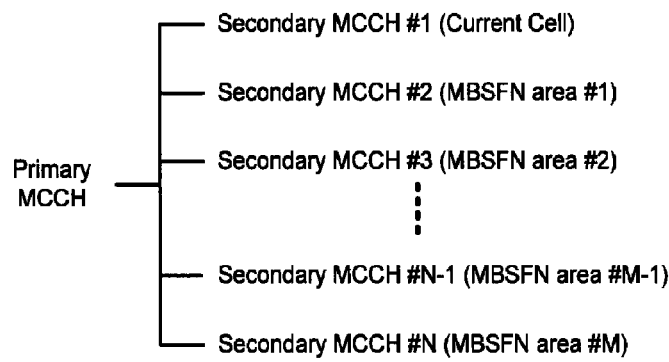
[Fig. 7]
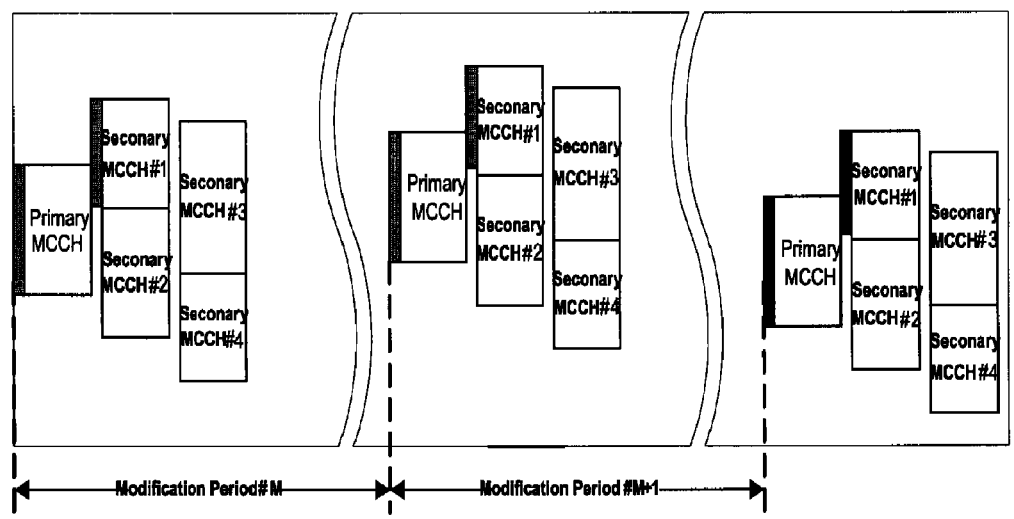

CONTROL CHANNEL RECEPTION METHOD FOR RECEIVING BROADCAST OR MULTICAST SERVICE

This application claims the benefit of PCT/KR2008/003467, filed on Jun. 18, 2008, along with U.S. Provisional Application Ser. No. 60/944,785, filed Jun. 18, 2007 and U.S. Provisional Application Ser. No. 60/945,090, filed Jun. 19, 2007, all of which are hereby incorporated herein by reference for all purposes in their entireties

TECHNICAL FIELD

The present invention relates to a radio (wireless) terminal which receives a broadcast or multicast service, and more particularly, to a reception method for a terminal, which, if control information received through a certain control channel being segmented into the one or more data units for transmission, receives the one or more data units from a network, and stores the one or more data units in every modification period if the control information cannot be completely decoded by the received one or more data units, wherein if the control information is determined to be modified in a current modification period, the terminal discards the stored one or more data units, and if the control information is determined not to be modified in the current modification period, the terminal does not discard the stored one or more data units.

BACKGROUND ART

FIG. 1 shows an exemplary network structure of an Evolved Universal Terrestrial Radio Access Network (E-UTRAN) as a mobile communication system to which a related art and the present invention are applied. The E-UTRAN system is a system that has evolved from the UTRAN system, and its standardization work is currently being performed by the 3GPP standards organization. The E-UTRAN system can also be referred to as a LTE (Long-Term Evolution) system.

The E-UTRAN generally comprises base stations (i.e., eNode B or eNB), and each eNB is connected by X2 interfaces. The eNBs are connected to terminals (User Equipment; UE) through a radio interface, and are connected to an Evolved Packet Core (EPC) through S1 interfaces.

The various layers of the radio interface protocol between the mobile terminal and the network may be divided into a layer 1 (L1), a layer 2 (L2) and a layer 3 (L3), based upon the lower three layers of the Open System Interconnection (OSI) standard model that is well-known in the field of communications systems. Among these layers, Layer 1 (L1), namely, the physical layer, provides an information transfer service to an upper layer by using a physical channel, while a Radio Resource Control (RRC) layer located in the lowermost portion of the Layer 3 (L3) performs the function of controlling radio resources between the mobile terminal and the network. To do so, the RRC layer exchanges RRC messages between the mobile terminal and the network.

FIGS. 2 and 3 show radio interface protocol architecture between a terminal and E-UTRAN based on 3GPP radio access network standards. Particularly, FIG. 2 shows radio protocol architecture in a control plane, and FIG. 3 shows radio protocol architecture in a user plane.

The radio interface protocol in FIGS. 2 and 3 has horizontal layers comprising a physical layer, a data link layer and a network layer, and has vertical planes comprising a user plane for transmitting user traffic and a control plane for transmitting control signals. The protocol layers in FIGS. 2 and 3 can be divided into a first layer (L1), a second layer (L2) and a third layer (L3) based on three lower layers of an Open System Interconnection (OSI) standard model widely known in communications systems. Hereinafter, each layer in the radio protocol control plane in FIG. 2 and a radio protocol user plane in FIG. 3 will be described.

A first layer, as a physical layer, provides an information transfer service to an upper layer using a physical channel. The physical layer is connected to its upper layer, called a Medium Access Control (MAC) layer, via a transport channel. The MAC layer and the physical layer exchange data via the transport channel. Data is transferred via a physical channel between different physical layers, namely, between the physical layer of a transmitting side and the physical layer of a receiving side. The physical channel is modulated based on an Orthogonal Frequency Division Multiplexing (OFDM) technique, and utilizes time and frequency as radio resources.

The MAC layer located at the second layer provides a service to an upper layer, called a Radio Link Control (RLC) layer, via a logical channel. The RLC layer of the second layer supports reliable data transmissions. The function of the RLC layer may be implemented as a functional block in the MAC layer. In this case, the RLC layer may not exist. A Packet Data Convergence Protocol (PDCP) layer of the second layer, in the radio protocol user plane, is used to efficiently transmit IP packets, such as IPv4 or IPv6, on a radio interface with a relatively narrow bandwidth. For this purpose, the PDCP layer reduces the size of an IP packet header which is relatively great in size and includes unnecessary control information, namely, a function called header compression is performed.

A Radio Resource Control (RRC) layer located at the lowest portion of the third layer is only defined in the control plane. The RRC layer controls logical channels, transport channels and physical channels in relation to establishment, re-configuration and release of Radio Bearers (RBs). Here, the RB signifies a service provided by the second layer for data transmissions between the terminal and the E-UTRAN. If an RRC connection is established between the RRC layer of the terminal and the RRC layer of the radio network, the terminal is in the RRC connected mode. Otherwise, the terminal is in an RRC idle mode.

A Non-Access Stratum (NAS) layer located at an upper portion of the RRC layer performs functions, such as session management, mobility management and the like.

One cell constructing an eNB is set to one of bandwidths of 1.25 MHz, 2.5 MHz, 5 MHz, 10 MHz, 20 MHz and the like, so as to provide downlink or uplink transmission services to multiple terminals. Here, different cells may be set to provide different bandwidths.

Downlink transport channels for transmitting data from a network to a terminal may comprise a Broadcast Channel (BCH) for transmitting system information, a Paging Channel (PCH) for transmitting paging messages and a downlink Shared Channel (SCH) for transmitting other user traffic or control messages. Traffic or control messages of a downlink point-to-multipoint service (multicast or broadcast service) may be transmitted either via a downlink SCH, or via a separate downlink Multicast Channel (MCH). In addition, uplink transport channels for transmitting data from a terminal to a network may comprise a Random Access Channel (RACH) for transmitting an initial control message and an uplink Shared Channel (SCH) for transmitting user traffic or control messages.

Logical channels which are located at an upper portion of transport channels and mapped to the transport channels include a Broadcast Control Channel (BCCH), a Paging Control Channel (PCCH), a Common Control Channel (CCCH), a MBMS point-to-multipoint Control Channel/Multicast Control Channel (MCCH), a MBMS point-to-multipoint Traffic Channel/Multicast Traffic Channel (MTCH), and the like.

FIG. 4 shows a related art control channel transmission.

The physical channel is comprised of a plurality of sub-frames on a time axis and a plurality of sub-carriers on a frequency axis. Here, one sub-frame is comprised of a plurality of symbols on the time axis. One sub-frame is comprised of a plurality of resource blocks (RBs), and a resource block is comprised of a plurality of symbols and a plurality of sub-carriers. In addition, each sub-frame may use specific sub-carriers of specific symbols (e.g., a first symbol) of a corresponding sub-frame for the Physical Downlink Control Channel (PDCCH), that is, the L1/L2 control channel. One sub-frame has a time duration of 0.5 ms, and a Transmission Time Interval (TTI) indicating a unit of time that data is transmitted has a time duration of 1 ms, corresponding to 2 sub-frames.

The wireless network may perform a counting process to check the presence of terminals that receive a specific point-to-multipoint service in a specific cell or to count the number of terminals. The point-to-multipoint service counting process refers to a process, in which if the wireless network transmits an access information message to the terminal via an MCCH channel, the terminal transmits an RRC Connection request message or a Cell Update message in response to the access information message.

In the related art, the MCCH channel (i.e., control channel) periodically transmits control information in every modification period, and the terminal determines that the control information transmitted from the MCCH channel has been modified in every modification period. Accordingly, the RLC layer of the terminal which receives the MCCH channel would discard RLC SDUs which were not completely received in a previous modification period. Even though the control information is always not modified in every modification period, the RLC layer of the terminal discards the RLC SDUs that were completely received in every modification period, thus to cause a great problem of inefficiently receiving such unmodified control information.

DISCLOSURE OF INVENTION

Technical Solution

The present invention is to provide a control information reception method for a terminal to efficiently receive a point-to-multipoint service (a broadcast or multicast service) which, if control information received through a certain control channel is segmented with the one or more data units for transmission, receives the one or more data units from a network, and stores the one or more data units in every modification period if the control information cannot be completely decoded by the received one or more data units, wherein if the control information is determined to be modified in a current modification period, the terminal discards the stored one or more data units, and if the control information is determined not to be modified in the current modification period, the terminal does not discard the stored one or more data units.

To implement at least the above feature in whole or in parts the present invention may provide a method for receiving control information for providing a point-to-multipoint service in a wireless communication system, the method comprising: receiving one or more data units from a network, wherein the control information being segmented into the one or more data units and the control information is received through a control channel; and storing the one or more data units if the control information can not be completely decoded by the received one or more data units.

The present invention may also provide a method for receiving control information for providing a point-to-multipoint service in a wireless communication system, the method comprising: receiving control information from a network using one or more data units, wherein the control information is received through a MCCH (Multicast Control Channel); and if a modification of the control information is notified within a current modification period through a PDCCH (Physical Downlink Control Channel) related to the MCCH, discarding at least one data unit that is received in a previous modification period.

Additional features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 1 shows an exemplary network structure of an Evolved Universal Terrestrial Radio Access Network (E-UTRAN) as a mobile communication system to which a related art and the present invention are applied;

FIG. 2 shows radio interface protocol architecture in a control plane between a terminal and an Evolved UMTS Terrestrial Radio Access Network (E-UTRAN) based on 3GPP radio access network standards;

FIG. 3 shows radio interface protocol architecture in a user plane between a terminal and an Evolved UMTS Terrestrial Radio Access Network (E-UTRAN) based on 3GPP radio access network standards;

FIG. 4 shows an exemplary view of a related art physical channel structure for control channel transmission;

FIG. 5 shows an exemplary protocol structure of the control channel (MBMS Control Channel; MCCH) according to the present invention;

FIG. 6 shows an exemplary structure of the control channel (MCCH) according to the present invention; and FIG. 7 shows an exemplary transmission method of the control channel (MCCH) according to the present invention.

MODE FOR THE INVENTION

One aspect of the present invention is the recognition by the present inventors regarding the problems and drawbacks of the related art described above and explained in more detail hereafter. Based upon such recognition, the features of the present invention have been developed.

The present invention may be embodied in a 3GPP communication technology, in particular, in the Universal Mobile Telecommunications System (UMTS) system, a communication apparatus and method thereof. However, the present invention may also be applied to all wired/wireless communications to which the technical scope of the present invention can be applied.

Hereinafter, description of structures and operations of the preferred embodiments according to the present invention will be given with reference to the accompanying drawings.

Referring to FIG. 5, the Radio Resource Control (RRC) layer of an eNB may periodically transmit MBMS control information through a control channel for an MBMS service, e.g., a Multicast or MBMS Control Channel (MCCH). Here, if the MBMS control information is to be transmitted via the MCCH channel, the Medium Access Control (MAC) layer of the eNB may transmit MCCH-RNTI (Radio Network Transaction Identifier) via a Physical Downlink Control Channel (PDCCH) related to the MCCH channel.

More specifically, the MCCH channel, which is a logical channel, according to the present invention may be divided into a Primary MCCH (P-MCCH) and a Secondary MCCH (S-MCCH), as shown in FIG. 6. Here, the P-MCCH channel is mapped onto a transport channel Downlink Shared Channel (DL SCH), and may be used for notification of the MBMS service provided by a cell. In addition, the P-MCCH channel may transmit Modified Service Information (MSI), Unmodified Service Information (USI), S-MCCH channel setting information, and the like. The service information may inform the terminal about a modification of MBMS control information related to a specific MBMS service. In addition, the service information may inform the terminal about information on which S-MCCH channel is used by the specific MBMS service.

The DL SCH channel transmitting the P-MCCH channel may include a PDCCH channel. The PDCCH channel may transmit PMCCH-RNTI which informs the transmission of the P-MCCH channel transmitted to a certain sub-frame. Here, the PDCCH channel may inform the PMCCH-RNTI together with update information. Upon receiving the update information through the PDCCH channel, the terminal may know whether or not MBMS control information transmitted via the P-MCCH channel is updated. For instance, the update information may include a certain value tag. If a value of a value tag received in a previous certain modification period is different from a value of a value tag received in the current modification period, the terminal determines that the MBMS control information has been changed (modified) and then stores the value of the value tag received in the current modification period.

The terminal performs monitoring of the PDCCH channel. If the PDCCH channel notifies an update of MBMS control information transmitted via the P-MCCH channel, the terminal receives modified service information transmitted via the P-MCCH channel. If a service which the terminal desires to receive is present in the modified service information, the terminal may receive an S-MCCH channel related to a corresponding service.

The MBMS service in the present invention may be divided into a single cell service which broadcasts to only a single cell, and a multi-cell service which broadcasts equally to multi cells. In addition, the S-MCCH channel may be divided into an S-MCCH channel #1 for the single cell service and an S-MCCH channel #N (N=2, 3, 4, . . . ) for the multi-cell service. Here, the S-MCCH channel #1 is used to inform MBMS control information related to the single cell service in a specific cell, and is transmitted via the transport channel DL SCH. In addition, the MBMS control information transmitted from the S-MCCH channel #1 in the specific cell may be different from MBMS control information transmitted from an S-MCCH channel #1 in another cell.

The MBMS control information transmitted from the S-MCCH channel #1 may include point-to-multipoint radio bearer information related to the single cell service, time scheduling information of an MBMS Traffic Channel (MTCH), and the like. That is, the terminal may receive an S-MCCH channel #1 that is set in the current cell, while receiving the MTCH channel related to the single cell service in the current cell.

The DL SCH channel transmitting the S-MCCH channel may include a PDCCH channel. The PDCCH channel may transmit SMCCH-RNTI which informs the transmission of the S-MCCH channel transmitted to a certain sub-frame. Here, the PDCCH channel may inform the SMCCH-RNTI together with update information. Upon receiving the update information through the PDCCH channel, the terminal may know whether or not MBMS control information transmitted via the S-MCCH channel is updated. For instance, the update information may include a certain value tag. If a value of a value tag received in a previous certain modification period is different from a value of a value tag received in the current modification period, the terminal determines that the MBMS control information has been changed (modified) and then stores the value of the value tag received in the current modification period.

If the PDCCH channel notifies an update (modification) of MBMS control information transmitted via the S-MCCH channel, the terminal receives modified service information transmitted via the S-MCCH channel. If a service which the terminal desires to receive is present in the modified service information, the terminal may receive an S-MCCH channel related to a corresponding service.

The S-MCCH channel for the multi-cell service may be used to transmit control information related to the multi-cell service transmitted by using an MBMS Single Frequency Network (MBSFN). The S-MCCH channel for the multi-cell service may be equally transmitted through the same radio resources in all cells that belong to one MBSFN region. Here, at least one S-MCCH channel may be set in the MBSFN region. The terminal may receive the S-MCCH channel from the cells belonging to the MBSFN region in a combination manner (or other similar scheme). The S-MCCH channel may be transmitted by being mapped onto the transport channel Multicast Channel (MCH) which supports the MBSFN.

FIG. 7 shows an exemplary transmission method of the MCCH channel according to the present invention. Referring to FIG. 7, the MCCH channel can be modified in every modification period. The modification of the MCCH channel may be informed to the terminal through service information such as Modified Service Information (MSI) or PDCCH channel. Here, for the MCCH channel transmitted via the DL SCH channel, the modification of the MCCH channel may be notified to the terminal through the service information (e.g., the MSI) or the PDCCH channel. In addition, for the MCCH channel transmitted via the MCH channel, the modification of the MCCH channel may be notified to the terminal through the service information (e.g., the MSI).

If information change (modification) in a current modification period is informed by the service information or the PDCCH channel, the terminal may receive the MCCH channel in the current modification period. If information change (modification) in a current modification period is not informed by the service information or the PDCCH channel, and if a terminal has successfully received the MCCH channel in the previous modification period, the terminal does not receive a corresponding MCCH channel in the current modification period. However, if the terminal has not successfully received the MCCH channel in the previous modification period, the terminal would receive the corresponding MCCH channel in the current modification period.

In FIG. 7, if there is no modification in a current modification period (M+1), the eNB may retransmit the data transmitted in the previous modification period (M) by using the same number in the current modification period (M+1). Here, the data refers to an RLC Protocol Data Unit (PDU), and the number may be an RLC Sequence Number.

If information change (modification) is not informed by the service information or the PDCCH channel in the current modification period, the RLC layer of the terminal may store the RLC PDUs which were received in the previous modification period, without discarding the same in the current modification period. Here, the terminal may receive in the current modification period the retransmission of the RLC PDUs that were not received in the previous modification period, and may reassemble the RLC SDUs of the previous modification period through the RLC PDUs recovered by the re-transmission. Here, the RLC layer of the terminal may forward the thusly reassembled RLC SDU to an upper layer of the RLC layer of the terminal, without considering its order. Meanwhile, if information changes (modification) in the current modification period is informed by the service information or the PDCCH channel, with respect to the corresponding MCCH channel, the RLC layer of the terminal discards all the RLC PDUs that were received in the previous modification period, without storing the same in the current modification period.

The present invention may provide a method for receiving control information for providing a point-to-multipoint service in a wireless communication system, the method comprising: receiving one or more data units from a network, wherein the control information being segmented into the one or more data units and the control information is received through a control channel; storing the one or more data units if the control information can not be completely decoded by the received one or more data units; determining whether or not the control information has been modified in a current modification period; discarding the stored one or more data units if it is determined that the control information has been modified, wherein the one or more data units are RLC PDUs (radio link control protocol data units), the control channel is a MCCH (Multicast control channel), the modification of control information is determined by receiving update information through a PDCCH (physical downlink control channel), the update information includes a value tag, the modification of control information is determined by using different control information that is received through the control channel and/or a different control channel, the MCCH comprises at least one of a P-MCCH (Primary MCCH) and S-MCCH (Secondary MCCH) and the MCCH is mapped to a DL-SCH (Downlink Shared Channel), the modification of control information is determined by receiving service information that is transmitted on the control channel, the service information includes at least one of modified service information (MSI) and unmodified service information (USI), the service information informs that which S-MCCH (Secondary MCCH) is used for the point-to-multipoint service, the PDCCH includes at least one of a PMCCH-RNTI (Primary Multicast Control Channel-Radio Network Temporary Identity) and a SMCCH-RNTI (Secondary Multicast Control Channel-Radio Network Temporary Identity), the S-MCCH comprises a S-MCCH#1 for a single cell service and a S-MCCH#N (N=2, 3, 4, . . . ) for a multiple cell service, the S-MCCH#N for the multiple cell service uses a MBSFN (Multimedia Broadcast Multicast Single Frequency Network).

It can be also said that the present invention may also provide a method for receiving control information for providing a point-to-multipoint service in a wireless communication system, the method comprising: receiving control information from a network using one or more data units, wherein the control information is received through a MCCH (Multicast Control Channel); and if a modification of the control information is notified within a current modification period through a PDCCH (Physical Downlink Control Channel) related to the MCCH, discarding at least one data unit that is received in a previous modification period.

Namely, the present invention has an effect of efficiently receiving MBMS control information for a terminal which, if control information received through a certain control channel is segmented with the one or more data units for transmission, receives the one or more data units from a network, and stores the one or more data units in every modification period if the control information cannot be completely decoded by the received one or more data units, wherein if the control information is determined to be modified in a current modification period, the terminal discards the stored one or more data units, and if the control information is determined not to be modified in the current modification period, the terminal does not discard the stored one or more data units.

Although the present invention is described in the context of mobile communications, the present invention may also be used in any wireless communication systems using mobile devices, such as PDAs and laptop computers equipped with wireless communication capabilities (i.e. interface). Moreover, the use of certain terms to describe the present invention is not intended to limit the scope of the present invention to a certain type of wireless communication system. The present invention is also applicable to other wireless communication systems using different air interfaces and/or physical layers, for example, TDMA, CDMA, FDMA, WCDMA, OFDM, EV-DO, Wi-Max, Wi-Bro, etc.

The exemplary embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.).

Code in the computer readable medium may be accessed and executed by a processor. The code in which exemplary embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

The invention claimed is:

1. A method for receiving control information for providing a point-to-multipoint service in a wireless communication system, the method comprising:
   receiving one or more data units from a network, wherein the control information being segmented into the one or more data units and the control information is received through a control channel;
   storing the one or more data units if the control information cannot be completely decoded by the received one or more data units;
   determining whether or not the control information has been modified in a current modification period; and
   discarding the stored one or more data units if it is determined that the control information has been modified.

2. The method of claim 1, wherein the one or more data units are RLC PDUs (radio link control protocol data units).

3. The method of claim 1, wherein the control channel is a MCCH (Multicast control channel).

4. The method of claim 1, wherein the modification of control information is determined by receiving update information through a PDCCH (physical downlink control channel).

5. The method of claim 4 wherein the update information includes a value tag.

6. The method of claim 1, wherein the modification of control information is determined by using different control information that is received through the control channel and/or a different control channel.

7. The method of claim 3, wherein the MCCH comprises at least one of a P-MCCH (Primary MCCH) and S-MCCH (Secondary MCCH) and the MCCH is mapped to a DL-SCH (Downlink Shared Channel).

8. The method of claim 1, wherein the modification of control information is determined by receiving service information that is transmitted on the control channel.

9. The method of claim 8, wherein the service information includes at least one of modified service information (MSI) and unmodified service information (USI).

10. The method of claim 8, wherein the service information informs that which S-MCCH (Secondary MCCH) is used for the point-to-multipoint service.

11. The method of claim 4 wherein the PDCCH includes at least one of a PMCCH-RNTI (Primary Multicast Control Channel-Radio Network Temporary Identity) and a SMCCH-RNTI (Secondary Multicast Control Channel-Radio Network Temporary Identity).

12. The method of claim 7, wherein the S-MCCH comprises a S-MCCH#1 for a single cell service and a S-MCCH#N (N=2, 3, 4 . . . ) for a multiple cell service.

13. The method of claim 12, wherein the S-MCCH#N for the multiple cell service uses a MBSFN (Multimedia Broadcast Multicast Single Frequency Network).

14. A method for receiving control information for providing a point-to-multipoint service in a wireless communication system, the method comprising: receiving control information from a network using one or more data units, wherein the control information is received through a MCCH (Multicast Control Channel); and if a modification of the control information is notified within a current modification period through a PDCCH (Physical Downlink Control Channel) related to the MCCH, discarding at least one data unit that is received in a previous modification period.

* * * * *